United States Patent [19]

Nicetto

[11] Patent Number: 5,223,278
[45] Date of Patent: Jun. 29, 1993

[54] CENTRIFUGAL CASTING MACHINE
[75] Inventor: Romeo Nicetto, Senago, Italy
[73] Assignee: Nicem S.r.l., Senago, Italy
[21] Appl. No.: 764,417
[22] Filed: Sep. 23, 1991
[30] Foreign Application Priority Data Oct. 2, 1990 [IT] Italy .................................. 21863/90[U]

[51] Int. Cl.⁵ .......................... B29C 39/08; B28B 1/20
[52] U.S. Cl. ........................... 425/150; 164/286;
264/311; 425/152; 425/162; 425/425;
425/451.9
[58] Field of Search ............... 164/152, 153, 154, 286,
164/292; 264/311; 425/150, 152, 162, 171, 425,
435, 450.1, 451.9

[56] References Cited

U.S. PATENT DOCUMENTS

| | | | |
|---|---|---|---|
| 1,992,241 | 2/1935 | Sargent et al. | 164/292 |
| 3,369,388 | 2/1968 | Jepson | 264/311 |
| 3,709,287 | 1/1973 | Klobas | 164/292 |
| 3,844,702 | 10/1974 | Dimmer et al. | 425/435 |
| 4,063,863 | 12/1977 | Hilmoe | 425/425 |
| 4,094,624 | 6/1978 | Halm | 264/311 |
| 4,157,931 | 6/1979 | Bricot et al. | 264/311 |
| 4,248,807 | 2/1981 | Gigante | 264/311 |
| 4,350,481 | 9/1982 | Corea et al. | 425/425 |
| 4,362,685 | 12/1982 | Simioni | 264/311 |

FOREIGN PATENT DOCUMENTS 1779098  9/1970  Fed. Rep. of Germany ...... 425/425
1337411  8/1963  France ................................ 164/292

Primary Examiner—Scott Bushey
Attorney, Agent, or Firm—Guido Modiano; Albert Josif

[57] ABSTRACT

The centrifugal casting machine for molding parts by centrifugal casting of metals, or metallic alloys, with a low melting point, or of synthetic materials, includes a main framework which supports a carousel which can rotate about a main axis and supports a mold. The carousel is actuated with a rotary motion about the main axis by a motor which is arranged so that the axis of its output shaft substantially coincides with the main axis.

19 Claims, 2 Drawing Sheets

CENTRIFUGAL CASTING MACHINE

BACKGROUND OF THE INVENTION

The present invention relates to a centrifugal casting machine, and in particular to a machine for molding parts by means of the centrifugal casting of metals, or metallic alloys, with a low melting point, or of synthetic materials, such as for example polyester- or polyurethane-based resins.

Machines are known which perform the casting of metals, or metallic alloys, with a low melting point or of synthetic materials in molds made of vulcanized rubber which are rotated during the introduction of the molten metal.

More particularly, said types of machine comprise a main framework which supports, so that it can rotate about a generally vertical main axis, a carousel on which a mold is arranged; said mold is composed of two half-molds which are substantially disk-shaped, face one another and are arranged so that their axes coincide with the main axis. The casting cavities are defined on the two faces of the half-molds which face one another, and are connected, by means of appropriate ducts defined in said half-molds, to a feed duct which extends axially in at least one of the two half-molds. During the casting step, the two half-molds are pressed against one another and the molten metal is poured into the feed duct, while the carousel, together with the mold, is rotated about the main axis so that the molten metal can fill the casting cavity by exploiting the centrifugal force.

An electric motor which is connected to the carousel by means of a transmission, generally of the belt type, is used for the rotary actuation of the carousel.

Said known types of machine have some disadvantages.

In fact, due to the arrangement of the motor, which is located laterally and is spaced from the main axis in order to allow the interposition of the transmission, relatively bulky overall volume occupation occurs.

Furthermore, since the transmission is generally used as a speed variator by using, in the case of a belt, an expanding pulley, it also requires the possibility of adjusting the position of the motor when the transmission ratio is changed.

SUMMARY OF THE INVENTION

The aim of the present invention is to obviate the above described disadvantages by providing a machine for molding parts by means of the centrifugal casting of metals, or metallic alloys, with a low melting point, or of synthetic materials, which has a modest volume occupation with respect to conventional machines.

Within the scope of this aim, an object of the invention is to provide a machine which is very simple in design and execution.

Another object of the invention is to provide a machine which, despite having great flexibility in use, is structurally simple.

A further object of the invention is to provide a machine which is highly reliable in operation although it requires reduced maintenance interventions.

This aim, these objects and others which will become apparent hereinafter are achieved by a centrifugal casting machine as defined in the appended claims.

BRIEF DESCRIPTION OF THE DRAWINGS

Further characteristics and advantages will become apparent from the detailed description of a machine according to the invention, illustrated only by way of non-limitative example in the accompanying drawings, wherein.

DESCRIPTION OF THE PREFERRED EMBODIMENTS

Figure 1:
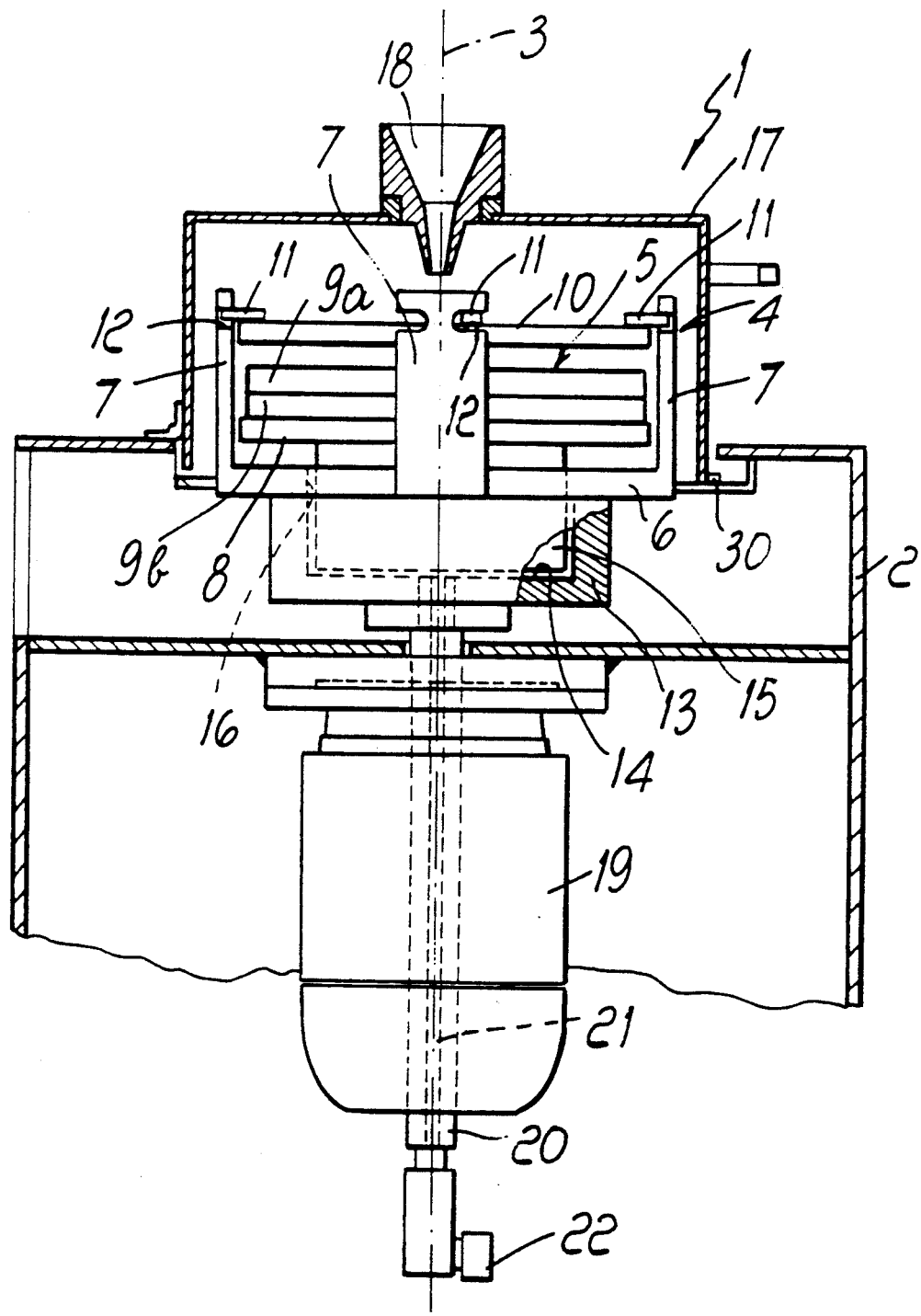
FIG. 1 is a sectional elevation view of a portion of the machine according to the invention.
Figure 2:
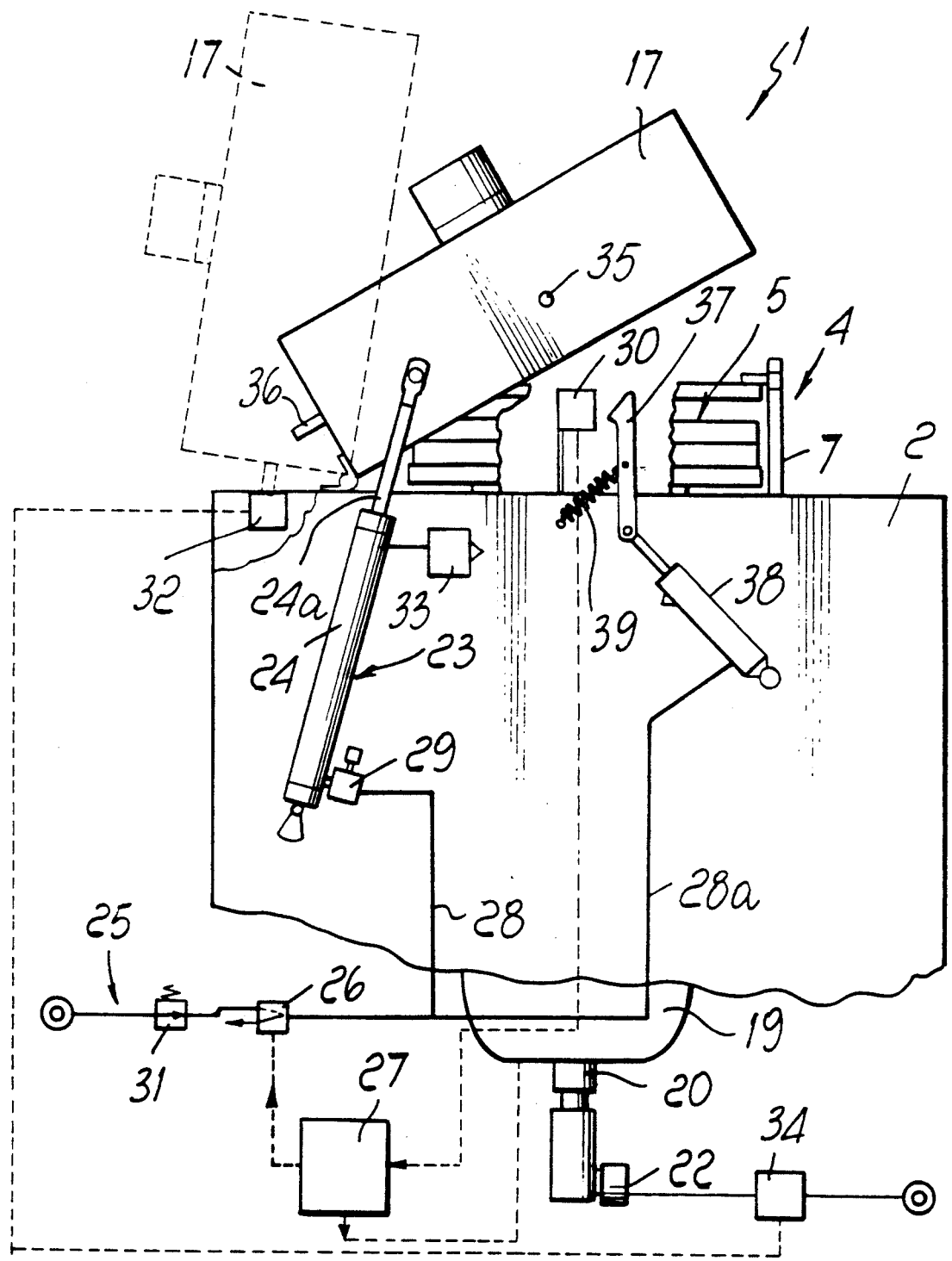
FIG. 2 is a lateral elevation view of a portion of the machine according to the invention, wherein the various elements for its actuation are schematically indicated.

With reference to the above figures, the machine according to the invention, generally indicated by the reference numeral 1, comprises a main framework 2 which supports, so that it can rotate about a main vertical axis 3, a carousel 4 on which a mold 5 of the type made of vulcanized rubber is mounted in a per se known manner.

More particularly, the carousel 4 is constituted by a flat bottom 6 from which four uprights 7 extend perpendicularly and are arranged along an ideal cylindrical surface the base whereof is the bottom 6. A supporting plate 8 is arranged on the carousel 4 between the uprights 7, and the mold 5 is arranged above said supporting plate 8 and is constituted, in a known manner, by two disk-shaped half-molds 9a and 9b the axes whereof coincide with the axis 3. The casting cavities are defined on the faces of the half-molds 9a and 9b which face one another, and are connected, by means of appropriate channels, to a central hole which is defined at the center of the upper half-mold 9a.

Above the mold 5 there is a contrast disk 10 which is arranged parallel to the supporting plate 8 and can be locked axially by means of tabs 11 to be inserted within seats 12 defined in the uprights 7 proximate to their upper end.

A cylindrical fluid activated presser element is defined wherein a body 13 is rigidly connected to the lower face of the bottom 6, and a chamber 14 is defined inside said body and accommodates, so that it can slide along the axis 3, a piston 15 which passes through a passage 16 defined in the bottom 6 and engages against the supporting plate 8.

A covering element 17 is provided around and above the carousel 4 and is traversed, along the axis 3, by a central hole 18 into which the molten material is poured.

The carousel 4 can be actuated with a rotary motion about the axis 3 by means of a motor 19 which, according to the invention, is arranged so that the axis of its output shaft 20 coincides with the axis 3. The motor 19 is conveniently constituted by a three-phase asynchronous electric motor, the speed whereof can be varied in a per se known manner and which is equipped with a known braking device which is not illustrated for the sake of simplicity.

The motor 19 might also be constituted by a direct-current electric motor or by a single-phase asynchronous electric motor.

More particularly, the output shaft 20 is fixed, with its upper end, to the cylindrical body 13, so as to be rigidly associated with the carousel 4, and the motor 19 is supported by the main framework 2.

Conveniently, an axial duct 21 is defined in the output shaft 20 and is connected, by means of a known rotating coupling 22 which is coupled to the lower end of the output shaft 20 and by means of a controllable electric valve 34, to a source of pressurized fluid, for example air. The duct 21 is connected to the chamber 14 for the actuation of the piston 15.

The machine according to the invention furthermore comprises lifting means 23 which controllably act upon the covering element 17 to transfer it from a closure position to an opening position in order to allow access to the mold 5 at the end of casting.

The covering element 17, which has a substantially cylindrical hollow configuration which is open at the lower base, is pivoted with its lower edge to the main framework 2, and the lifting means are constituted by a fluid-activated jack 24 which is pivoted to the framework 2 with its body and to a portion of the covering element 17 with the end of the stem 24a of its piston.

The fluid-activated jack 24 is of the single-action pneumatic type, and is actuated through a feed line 25 on which an electric valve 26 is arranged; said electric valve 26 can be controlled by means of an electronic control element 27 which supervises the operation of the machine and also includes an electronic device for braking and varying the rotation rate of the motor 19.

More particularly, the valve 26 is arranged on a feed duct 28 of the jack 24 and can be controlled so as to connect said duct 28 to a source of pressurized air, in order to lift the covering element 17, or to the atmosphere, or with a discharge, to allow its lowering by gravity.

Advantageously, a flow regulator 29 is provided in the duct 28 and controls the discharge of the jack 24, adjusting the closure speed of the covering element 17.

The chamber of the jack 24, inside which its piston slides, is connected, on the side opposite to the inlet of the duct 28 with respect to the piston, to a one-way valve 33 which is also provided with a flow regulator which, in the case of pneumatic actuation, discharges into the atmosphere. In this manner it is possible to adjust the lifting speed of the covering element 17 in order to obtain a lifting speed which differs from the lowering speed.

Means for detecting the position of the covering element 17 are provided between the covering element 17 and the framework 2. Said detection means comprise a first microswitch 30 supported by a support which is fixed to the framework 2 and is arranged laterally to the covering element 17, which is provided with a pin 35 making contact with the microswitch 30 when the covering element 17 is in the closure position. The microswitch 30 is connected to the control element 27 so as to indicate thereto the closure position of the covering element 17.

The means for detecting the position of the covering element 17 furthermore comprise a second microswitch 32 arranged on the framework 2 behind the covering element 17, which is provided with a protrusion 36 making contact with said microswitch 32 when the covering element 17 is fully raised and is in an equilibrium condition. The microswitch 32 controls the electric valve 34, as will become apparent hereinafter.

Advantageously, there are also safety means for preventing the accidental opening of the covering element 17 during the operation of the machine. Said safety means comprise a pawl 37 which is arranged proximate to the microswitch 30 and engages the pin 35 when the covering element is in the closure position. The pawl 37 is actuated by a single-action fluid-activated jack 38 which is fed by a branch 28a of the duct 28 so that the pawl 37 releases the pin 35 only when the cylinder 23 is activated, as will become apparent hereinafter. A delay device, for example a choke, is provided on the duct 28 so that the pawl 37 releases the pin 35 before the jack 23 starts to lift the covering element 17. The disengagement of the pawl 37 from the pin 35 is biased by a spring 39.

For the sake of completeness in description, it should be noted that a manostat 31 is arranged on the feed line 25.

The operation of the machine according to the invention is as follows.

After placing the mold 5 on the carousel 4 and after fixing the contrast disk 10 to the carousel 4, the operator acts on the covering element 17 so as to move it from its equilibrium position and cause only the separation of the protrusion 36 from the microswitch 32. This separation causes the actuation of the valve 34 which connects the axial duct 21 to the source of compressed air so as to press the mold 5 against the contrast disk 10.

Meanwhile, the covering element 17 descends by gravity with a controlled speed, as explained above, and when the pin 35 makes contact with the microswitch 30 the electronic control element 27 actuates the motor 19 which rotates the carousel 4.

The molten material is poured through the central hole 18 and fills the casting cavities of the mold. Once molding has occurred, the control element 27 stops the motor 19 and, by switching the position of the valve 26, causes the release of the pawl 37 from the pin 35 and the opening of the covering element 17, thus indicating the end of the molding cycle to the operator, who can promptly act in order to extract the mold 5 and unload the molded parts.

After the operator has repositioned the mold 5 and the contrast disk 10 on the carousel, the operating cycle resumes as already described.

In practice it has been observed that the machine according to the invention fully achieves the intended aim, since the particular arrangement of the motor allows to reduce the overall volume occupation of the machine, considerably simplifying its design and execution.

A further advantage, which arises from the automatic opening of the covering element, is that the work of the operator is reduced and the end of the molding cycle is indicated.

In practice, the materials employed, as well as the dimensions, may be any according to the requirements and to the state of the art.

I claim:

1. Centrifugal casting machine comprising:
   a main framework;
   a carousel rotatably supported on said main framework;
   a main axis defined by said carousel;
   a mold supported on said carousel;
   a motor having an output shaft, said output shaft being substantially coaxial to said main axis and connecting said motor to said carousel for rotating said carousel about said main axis;
   a fluid activated presser element supported by said carousel and acting on said mold, and;
   an axial duct defined in said output shaft and communicating with said fluid activated presser element, said axial duct being connectable to a source of pressurized fluid for actuating said fluid activated presser element;

wherein said main axis, said output shaft and said axial duct are coaxial.

2. Centrifugal casting machine according to claim 1, wherein said carousel comprises:

a bottom;

a plurality of uprights extending upwardly from said bottom, and;

and a supporting plate located on said carousel between said uprights.

3. Centrifugal casting machine according to claim 1 wherein said mold comprises two disk-shaped half molds, said half molds defining half mold axes, said half mold axes being coaxial with said main axis, said output shaft and said axial duct.

4. Centrifugal casting machine according to claim 2, further comprising:

seats defined in said uprights;

a contrast disk extending parallel to said supporting plate;

tabs connected to said contrast disk and being inserted into said seats, whereby to axially position said contrast disk with respect to said supporting plate.

5. Centrifugal casting machine according to claim 2, further comprising:

a cylindrical body connected to said bottom;

a chamber define within said cylindrical body;

a passage defined in said bottom, and;

a piston passing through said passage and engaging against said supporting plate;

wherein said axial duct communicates with said chamber for actuating said piston.

6. Centrifugal casting machine according to claim 1, wherein said carousel further comprises a bottom and a cylindrical body, said cylindrical body being connected to said bottom, said motor being fixed to said main framework, said output shaft of said motor being connected to said cylindrical body.

7. Centrifugal casting machine according to claim 1, further comprising;

a covering element pivotally connected to said main framework;

a fluid activated jack having a stem, said jack being pivotally connected to said main framework, said stem being pivotally connected to said covering element;

pneumatic actuation means for activating said jack, and;

first microswitch means for detecting a closure position of said cover element;

second microswitch means for detecting an open position of said cover element, and;

pawl means for preventing accidental opening of said cover element during operation of said centrifugal casting machine.

8. Centrifugal casting machine according to claim 7, wherein said first microswitch means comprise;

a support fixed to said main framework;

a first microswitch supported by said support, and;

a pin connected to said covering element and contacting said microswitch first when said covering element is in a closed position, and;

wherein said second microswitch means comprise;

a second microswitch connected to said framework, and;

a protrusion connected to said covering element and contacting said second microswitch when said covering element is in an open position, and;

wherein said pawl means comprise;

a pawl arranged proximate to said first microswitch and engaging with said pin when said covering is in said closure position;

fluid activated means communicating with said pneumatic actuation means for releasing said pawl from said pin upon actuation of said fluid activated jack.

9. Centrifugal casting machine comprising:

a main framework;

a carousel rotatably supported on said main framework;

a main axis defined by said carousel;

a mold supported on said carousel;

a motor having an output shaft, said output shaft being substantially coaxial to said main axis and connecting said motor to said carousel for rotating said carousel about said main axis;

a fluid activated presser element supported by said carousel and acting on said mold, and;

an axial duct defined in said output shaft and communicating with said fluid activated presser element, said axial duct being connectable to a source of pressurized fluid for actuating said fluid activated presser element, said main axis, said output shaft and said axial duct being coaxially aligned;

wherein said carousel comprises;

a bottom;

a plurality of uprights extending upwardly from said bottom;

a supporting plate located on said carousel between said uprights;

a contrast disk extending parallel to said supporting plate;

engagement means for releasably connecting said contrast disk to said uprights, whereby to axially position said contrast disk with respect to said supporting plate.

10. Centrifugal casting machine according to claim 9, wherein said engagement means comprise;

seats defined in said uprights, and;

tabs connected to said contrast disk and being inserted into said seats.

11. Centrifugal casting machine according to claim 9, wherein said mold comprises two disk-shaped half molds, said half molds defining half mold axes, said half mold axes being coaxial with said main axis, said output shaft and said axial duct.

12. Centrifugal casting machine according to claim 9, further comprising;

a cylindrical body connected to said bottom;

a chamber defined within said cylindrical body;

a passage defined in said bottom, and;

a piston passing through said passage and engaging against said supporting plate;

wherein said axial duct communicates with said chamber for actuating said piston.

13. Centrifugal casting machine according to claim 9, wherein said carousel further comprises a cylindrical body, said cylindrical body being connected to said bottom, said motor being fixed to said main framework, said output shaft of said motor being connected to said cylindrical body.

14. Centrifugal casting machine according to claim 9, further comprising;

a covering element pivotally connected to said main framework, a fluid activated jack having a stem, said jack being pivotally connected to said main framework, said stem being pivotally connected to said covering element;

pneumatic actuation means for activating said jack, and;

first microswitch means for detecting a closure position of said cover element;

second microswitch means for detecting at open position of said cover element, and;

pawl means for preventing accidental opening of said cover element during operation of said centrifugal casting machine.

15. Centrifugal casting machine according to claim 14, wherein said first microswitch means comprise;

a support fixed to said main framework;

a first microswitch supported by said support, and;

a pin connected to said covering element and contacting said first microswitch when said covering element is in a closed position, and;

wherein said second microswitch means comprise;

a second microswitch connected to said framework, and;

a protrusion connected to said covering element and contacting said second microswitch when said covering element is in an open position, and;

wherein said pawl means comprise;

a pawl arranged proximate to said first microswitch and engaging with said pin when said covering is in said closure position;

fluid activated means communicating with said pneumatic actuation means for releasing said pawl from said pin upon actuation of said fluid activated jack.

16. Centrifugal casting machine comprising;

a main framework;

a carousel rotatably supported on said main framework;

a main axis defined by said carousel;

a mold supported on said carousel;

a motor having an output shaft, said output shaft being substantially coaxial to said main axis and connected said motor to said carousel for rotating said carousel about said main axis;

a fluid activated presser element supported by said carousel and acting on said mold, and;

an axial duct defined in said output shaft and communicating with said fluid activated presser element, said axial duct being connectable to a source of pressurized fluid for actuating said fluid activated presser element, said main axis, said output shaft and said axial duct being coaxially aligned;

wherein said carousel comprises;

a bottom;

a plurality of uprights extending upwardly from said bottom;

a supporting plate located on said carousel between said uprights;

a contrast disk extending parallel to said supporting plate;

seats defined in said uprights, and;

tabs connected to said contrast disk and being inserted into said seats for releasably connecting said contrast disk to said uprights, whereby to axially position said contrast disk with respect to said supporting plate;

wherein said mold comprises two disk-shaped half molds, said half molds defining half mold axes, said half mold axes being coaxial with said main axis, said output shaft and said axial duct;

said centrifugal casting machine further comprising;

a cylindrical body connected to said bottom;

a chamber defined within said cylindrical body;

a passage defined in said bottom, and;

a piston passing through said passage and engaging against said supporting plate, said axial duct communicating with said chamber for actuating said piston.

17. Centrifugal casting machine according to claim 16, said motor being fixed to said main framework, said output shaft of said motor being connected to said cylindrical body.

18. Centrifugal casting machine according to claim 16, further comprising;

a covering element pivotally connected to said main framework, a fluid activated jack having a stem, said jack being pivotally connected to said main framework, said stem being pivotally connected to said covering element;

pneumatic actuation means for activating said jack, and;

first microswitch means for detecting a closure position of said cover element;

second microswitch means for detecting an open position of said cover element, and;

pawl means for preventing accidental opening of said cover element during operation of said centrifugal casting machine.

19. Centrifugal casting machine according to claim 16, wherein said first microswitch means comprise;

a support fixed to said main framework;

a first microswitch supported by said support, and;

a pin connected to said covering element and contacting said first microwsitch when said covering element is in a closed position, and;

wherein said second microswitch means comprise;

a second microswitch connected to said framework, and;

a protrusion connected to said covering element and contacting said second microswitch when said covering element is in an open position, and;

wherein said pawl means comprise;

a pawl arranged proximate to said first microswitch and engaging with said pin when said covering is in said closure position;

fluid activated means communicating with said pneumatic actuation means for releasing said pawl from said pin upon actuation of said fluid activated jack.

* * * * *